United States Patent
Molnar

(10) Patent No.: US 7,327,811 B2
(45) Date of Patent: Feb. 5, 2008

(54) METHOD AND APPARATUS FOR FACILITATING SIGNAL DISCRIMINATION IN A WIRELESS NETWORK BY APPLYING KNOWN FREQUENCY OFFSETS

(75) Inventor: Karl James Molnar, Cary, NC (US)

(73) Assignee: Telefonaktiebolaget L M Ericsson, Stockholm (SE)

( * ) Notice: Subject to any disclaimer, the term of this patent is extended or adjusted under 35 U.S.C. 154(b) by 744 days.

(21) Appl. No.: 10/249,329

(22) Filed: Apr. 1, 2003

(65) Prior Publication Data

US 2004/0196930 A1 Oct. 7, 2004

(51) Int. Cl.
H04L 27/06 (2006.01)

(52) U.S. Cl. ...................................... 375/344

(58) Field of Classification Search ................ 375/316, 375/340, 341, 344, 354, 346, 347
See application file for complete search history.

(56) References Cited

U.S. PATENT DOCUMENTS

| | | | | |
|---|---|---|---|---|
| 4,383,332 A * | 5/1983 | Glance et al. | ............ | 455/562.1 |
| 5,878,093 A * | 3/1999 | Molnar et al. | ............... | 375/347 |
| 6,298,227 B1 | 10/2001 | Molnar | | |
| 6,304,618 B1 | 10/2001 | Hafeez et al. | | |
| 6,658,075 B1 * | 12/2003 | Aftelak | ......................... | 375/375 |
| 6,847,688 B1 * | 1/2005 | Molnar et al. | ............... | 375/344 |
| 2003/0081633 A1 * | 5/2003 | Ben-Eli et al. | ............. | 370/503 |

FOREIGN PATENT DOCUMENTS

| EP | 0801473 | 10/1987 |
|---|---|---|
| EP | 0656697 | 11/1993 |
| EP | 801473 A2 * | 10/1997 |
| WO | WO 99/56407 | 11/1999 |

OTHER PUBLICATIONS

International Search Report, Telefonaktiebolaget LM Ericsson, PCT/US04/009015, (Sep. 7, 2004).
Written Opinion, Telefonaktiebolaget LM Ericsson, PCT/US04/009015, filed (Sep. 7, 2004).
Cui et al., "Blind Adaptation of Antenna Arrays Using a Simple Algorithm Based on Small Frequency Offsets", *IEEE Transactions on Communications*, vol. 46, No. 1, pp. 61-70 (Jan. 1998).

(Continued)

*Primary Examiner*—Kevin Burd
(74) *Attorney, Agent, or Firm*—Moore & Van Allen, PLLC; Steven B. Phillips

(57) ABSTRACT

Method and apparatus for demodulation in a system having known frequency offsets. First and second signals from two users occupy substantially the same bandwidth and use substantially the same carrier frequency, while the relative frequencies of the signals on different transmit antennas associated with a base station are adjusted to have known, specific frequency offsets. These known frequency offsets are used at the receiver to aid in estimating any known frequency errors and to demodulate the multiple transmitted signals. In addition to being useful for demodulation, known frequency offsets can be assigned to each of a plurality of base stations to facilitate identification of a particular base station. The approach can be used for any type of time domain multiple access (TDMA) system, including Global System for Mobile (GSM), or for code division multiple access (CDMA) systems.

29 Claims, 5 Drawing Sheets

OTHER PUBLICATIONS

Alamouti, "A Simple Transmit Diversity Technique for Wireless Comm." *IEEE Journal on Selected Areas in Comm.*, vol. 16, No. 8, pp. 1451-1458, (Oct. 1998).

Stojanovic et al., "Adaptive multichannel combining and equaliz. for underwater acoustic comm.", *J. Acoust. Soc. Am.* 94 (3), Pt. 1, pp. 1621-1631, (Sep. 1993).

Zangi et al., "Maximizing Data Rate over $M$-Input/1-Output Channels", *IEEE Vehicular Technology Conference*, (Spring, 2002).

Molnar et al., "Joint Carrier Phase Tracking and Multi-User Demodulation of Narrow-Band Signals", *IEEE Vehicular Technology Conference*, (Sep. 2001).

Hafeez et al., "Co-Channel Interference Cancellation for D-Amps Handsets", *Proceedings of the 49th IEEE Vehicular Technology Conference*, (May 1999).

Arslan et al., "Joint Channel Tracking of Co-Channel Signals for IS-136 Mobiles", *IEEE Vehicular Technology Society, Fall Vehicular Tech. Conf.*, (Sep. 2000).

Hamkins et al., "A Comparative Study of Co-Channel Interference Suppression Techniques", *Proc. of the Fifth Int. Mobile Satllite Conf.*, pp. 327-332 (Jun. 1997).

Barry et al., "A multidimensional Phase-Locked Loop for Blind Equaliz. of Multi-Input Mulit-Output Channels", *Int. Conf. on Comm.* vol. 3, pp. 1307-1312, (1996).

Murata et al., "Joint Frequency Offset and delay Profile Estimation Technique for Nonlinear Co-channel Interference Canceller", *Intnl. Symposium on Personal Indoor and Mobile Comm.*, (1998).

Batra et al., "Blind Unitary Source Separation using a Multidimensional Phase-Locked Loop", pp. 61-74, *IEEE Signal Proc. Workshop* (1997).

Foschini, "Layered Space-Time Architecture for Wireless Communication in a Fading Environment When Using Multi-Element Antennas", *Bell Labs Technical Journal* (Aug. 1996).

Foschini et al., "Simplified Processing for High Spectral Efficiency Wireless Communication Employing Multi-Element Arrays", *IEEE Journal on Selected Areas in Communications*, vol. 17, No. 11, pp. 1841-1852, (Nov. 1999).

S. Verdu, *Multiuser Detection*, Cambridge Univ. Press, Cambridge, UK (1998).

* cited by examiner

METHOD AND APPARATUS FOR FACILITATING SIGNAL DISCRIMINATION IN A WIRELESS NETWORK BY APPLYING KNOWN FREQUENCY OFFSETS

BACKGROUND OF INVENTION

The use of multiple transmit antennas in digital, wireless communication systems has been shown to be useful for increasing data rate and for improving performance for receivers with either single or multiple receive antennas. In these systems, the transmitted signals are transmitted with substantially the same carrier frequency and bandwidth so that their channel responses overlap in the frequency domain. Many known approaches are open-loop systems, i.e. there is no feedback between the receiver to the transmitter regarding knowledge about the channel response. When this channel knowledge is present, then multiple transmit antennas can be used to improve data rates using closed-loop techniques.

The advantage in the above techniques is obtained since the channels are not the same from different transmit (Tx) antennas to the receive (Rx) antenna(s). The various approaches rely upon being able discriminate the different transmitted signals from one another. When coherent reception of the transmitted signals is used, the channel response for each transmitted signal is obtained at the receiver via an estimation process. This estimation process is complex, processor intense and less accurate when channels from different transmitted signals interfere with one another. Additionally, multipath makes the estimation process more difficult since the signals overlap in time (delay) with one another.

Semi-blind techniques have been used to estimate the channel response in order to perform joint demodulation for one desired signal and one interferer. However, in those cases that channel responses for the two users are similar, the performance of the joint demodulation receiver degrades compared to the case when channel estimates can be easily distinguished. One technique for improving performance in fading channels is to adaptively update (track) the channel estimates. However, this leads to the problem of channel switching, where estimated channels are incorrectly assigned to user signals. Even after the fading waveforms be distinguishable, channel estimates may be incorrectly assigned to users. This channel switching results in detection errors for long bursts, until the channel estimates are reassigned to their correct users, for example, by another channel switch.

SUMMARY OF INVENTION

The present invention involves the use of known frequency offsets to facilitate signal discrimination by helping to distinguish signals transmitted from different antennas of a base station. While the signals occupy substantially the same bandwidth and use substantially the same carrier frequency, the relative frequencies of the signals on different transmit antennas are adjusted at baseband or an intermediate frequency so that there is a small, specific frequency separation between signals transmitted from the different antennas. This results in each signal having a different offset from the carrier, resulting in a set of frequency offsets for the signals relative to the carrier. This set of frequency offsets results in a higher degree of separability in receivers that perform channel estimation or interference cancellation. Additionally, the frequency offsets can help distinguish signals from different base stations since different, known sets of frequency offsets can be assigned to each of a plurality of base stations. The approach can be used for any type of time domain multiple access (TDMA) system, including Global System for Mobile (GSM) or for code division multiple access (CDMA) systems.

In some embodiments, a base station having at least two antennas communicates or transmits first and second signals to a mobile terminal by first establishing known frequency offsets to be applied to the first and second signals. The frequency offsets are known or made known at the mobile terminal. The frequency offsets may be agreed as part of the system design, or it may be looked up from a data structure or table in the base station's memory. The mobile terminals may have the set of frequency offsets stored, or the base station may transmit the set of frequency offsets to the mobile terminal over a control channel prior to beginning normal operation. The base station applies the known frequency offsets to the first and second signals, and upconverts the signals for transmission at substantially the same carrier frequency and bandwidth. In addition to the applied known frequency offsets, there may be unknown frequency errors introduced by the transmitter. This places requirements on the design of the known frequency offsets, although these requirements may be relaxed by locking the carrier frequencies of the different transmit chains. The transmitted signals can then be demodulated at a mobile terminal based at least in part on the known frequency offsets.

A mobile terminal in the system according to some embodiments receives the first and second signals from first and second associated transmit antennas, and downconverts the signals. The mobile terminal detects symbols in the first and second signals using channel estimates and frequency estimates for the first and second symbols based at least on part on the set of known frequency offsets. At the mobile receiver, frequency estimation is required to correct the unknown frequency errors present in the receive signals. One approach is to use automatic frequency control (AFC) techniques, although, other frequency compensation methods could be used instead.

The system according to some embodiments of the invention can be designed so that a plurality of neighboring base stations use a plurality of corresponding sets of frequency offsets. Information on the frequency offsets can be known and programmed into mobile terminals, or can be transmitted initially to a mobile terminal over a control channel and stored in memory. The base stations each have a memory associated with the antennas and transceiver apparatus where frequency offset information is stored. A mobile terminal, which includes a radio block, one or more antennas, processing and control logic, and baseband logic, can use the frequency offset to identify a base station, facilitating ranging and other functions. The various hardware and software or microcode in the base stations and mobile terminals form the means to carry out the various aspects of the invention.

DETAILED DESCRIPTION

Figure 1:
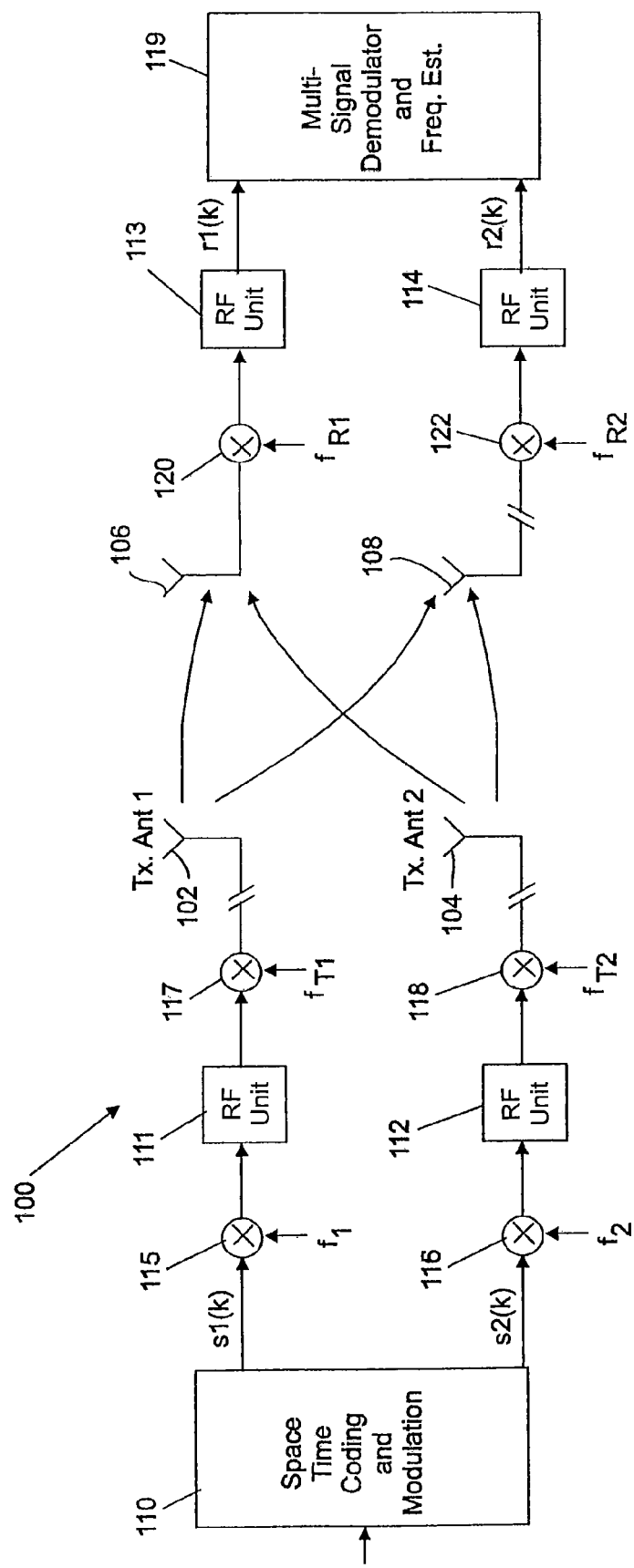
FIG. 1 illustrates a functional block diagram and method of operation of a transmitter and receiver operating according to embodiments of the present invention.

This invention is described in terms of example embodiments, which take the approach of using different frequency offsets for signals transmitted from different antennas, but using the same carrier frequency on each antenna. These embodiments are given by way of example, and those of ordinary skill in the art will recognize that there are other embodiments, which may be implemented without departing from scope of the appended claims.

The embodiments disclosed involve both transmission and reception of signals in accordance with the invention. In the example embodiments, a mobile terminal receives, and a base station transmits. The invention will work equally well in reverse, with equipment of the appropriate design as will be understood by persons of skill in the art. Additionally, the methods of the invention can be used between two mobile transceivers or two fixed transceivers.

With respect to some of the mathematical formula and notations, the reader should be aware that subscripts and superscripts sometimes couldn't be used in drawings because they would result in text that may be too small to read clearly. In some cases, characters which are more properly written as subscripts or superscripts are shown in regular text, for example $s_1(k)$ might be shown as s1(k). In cases herein where a drawing is being discussed directly, the notation in the drawing is used. Otherwise, proper mathematical notation may be used. The equations herein are still understandable to those of skill in the art.

In multiple-input multiple-output (MIMO) systems, data rate is increased without substantially increasing the bandwidth of the composite transmitted signal. The drawback is that the transmitted signals interfere with each other requiring a more complicated receiver to separate the signals. To facilitate this separation, with simpler receivers, different frequency offsets are used together with a frequency estimation technique to help distinguish the signals at the receiver. Estimation techniques include joint frequency estimation or multiple-user phase-locked loop approaches as are known in the art.

Furthermore, mobile terminals often receive transmissions from multiple base stations. The frequency offsets themselves can be used to help distinguish which signals are transmitted from which base stations, by assigning a unique set of known offsets to each of a plurality of neighboring base stations, each having at least two antennas. A mobile terminal can then use this information in detecting the desired transmitted signal or rejecting the signals from interfering base stations. Additionally, these unique frequency offsets may be used to estimate other important characteristics of the transmitted signals. For example, the received signal strength may be used to assist in performing soft-handovers, and more accurate signal strength values may be obtained when the signals can be assigned to known base station. Also, the identification of known base stations can be used for mobile ranging and positioning.

One embodiment of the invention is shown by the block diagram in FIG. 1 of system 100, which shows the desired signal transmitted with two transmit (Tx) antennas, 102, and 104 and received by two receive (Rx) antennas, 106 and 108. original signal is first coded and interleaved and sent to a space-time coding and modulation unit, 110. The purpose of this block is to map the modulated signals onto the different Tx antennas. For example, in the so-called "V-BLAST" scheme, different symbols are modulated and mapped onto different transmit antennas directly (i.e. without additional space-time coding). The V-BLAST scheme is described in Foschini, G. et al., "Simplified Processing for High Spectral Efficiency Wireless Communication Employing Multi-element Arrays," *Journal on Selected Areas in Communications*, 17 (11):1841-1852, November 1999, which is incorporated herein by reference.

Transmitter RF units 111 and 112 upconvert and then transmit the signals. After the signals are transmitted over the channel and received at the Rx antennas, the signals are downconverted at receiver RF units 113 and 114 and sent to a demodulation unit. The demodulation unit performs channel and frequency estimation in order to coherently detect the transmitted signals. After demodulation, the resulting detected signals are passed to a decoder unit, which detects the original input bits.

In FIG. 1, signals s1(k) and s2(k) have frequency offsets $f_1$ and $f_2$ applied at 115 and 116, respectively. Random frequency errors are also present, and are shown modeled in the same way at 117 and 118, respectively, as $f_{T1}$ and $f_{T2}$. These random frequency errors occur, for example, due to the tolerances of manufactured clock circuitry, environmental conditions, and similar factors. In the case of two receive antennas as shown in FIG. 1, received signals r1(k) and r2(k) each contain a contribution from the first and second transmitted signals, s1(k) and s2(k) as indicated by the arrows between the transmit and receive antennas. In the case of a receiver with one antenna, a single received signal r(k) contains a component from both s1(k) and s2(k).

It should be noted for the above approach that detection performance in the steady-state period of the AFC may be better when there is a significant frequency difference between the two signals. This occurs, in effect, since the ability to separate the two signals relies upon differences in the channel responses between users. Thus, if the difference between the additional offsets caused by random system errors, $/f-f_{T1}/$ is large enough, this adds an extra dimension which to make the channels different. Systems have been proposed for some time that rely upon differences in the underlying channel responses in order to obtain their improved performance. Adding the known frequency offsets to each transmit chain improves the system as described above. For receivers that use multiuser AFC loops, faster convergence during the transient period is obtained by separating the frequencies of the different transmitted signals so little or no ambiguity exists between them. Second, better detection performance is obtained during the steady-state period by reducing the probability of having similar channel responses over a data-burst.

Returning to the 2×2 MIMO system of FIG. 1, frequencies $f_1$ and $f_2$ are applied to the first and second transmit signals, respectively, to achieve the known offsets. This approach can easily be extended to more than two transmit antennas. In FIG. 1, the baseband representation is shown. However, the approach can be used for systems at some carrier or intermediate frequency. The two frequencies $f_1$ and $f_2$ should have a separation larger than the maximum of 2 $f_{max1}$ and 2 $f_{max2}$, where $f_{max1}=/f_{T1}/$ and $f_{max2}=/f_{T2}/$ represent the largest expected frequency errors on each transmit antenna. In other words, If $/f_1-f_2/$ should be greater than $2\max(f_{max1},f_{max2})$. If there are M>2 transmit antennas, then the above item holds for frequencies $f_m$ and $f_n$, for any two antennas m and n where $f_{max1}=|f_{T1}|$ and $f_{max2}=|f_{T2}|$ represent the largest expected frequency errors on each transmit antenna. In other words, $|_1-f_2|$ should be greater than $2\max(f_{max1},f_{max2})$. If there are M>2 transmit antennas, then the above item holds for frequencies $f_m$ and $f_n$, for any two antennas m and n where m≠n. Additionally, random frequency errors are introduced at the receiver, and are modeled by applying the frequency errors $f_{R1}$ and $f_{R2}$ at 120 and 122, respectively. The demodulation scheme now detects symbols in the signals with the known frequency offsets by down converting and applying frequency and channel estimation, smoothing, etc., in block 119. The values of $f_1$ and $f_2$ are known at the receiver and typically stored so that they can be accessed and used to initialize the frequency estimation approach. As previously mentioned, automatic frequency control (AFC) techniques, described in further detail below, can be used for frequency estimation in block 119. However, other techniques known in the art can be applied. For example, a maximum-likelihood estimation technique that uses known training sequences or pilot channels can be used, or a phase-locked loop (PLL) can be applied in place of or in addition to other traditional AFC approaches.

Figure 2:
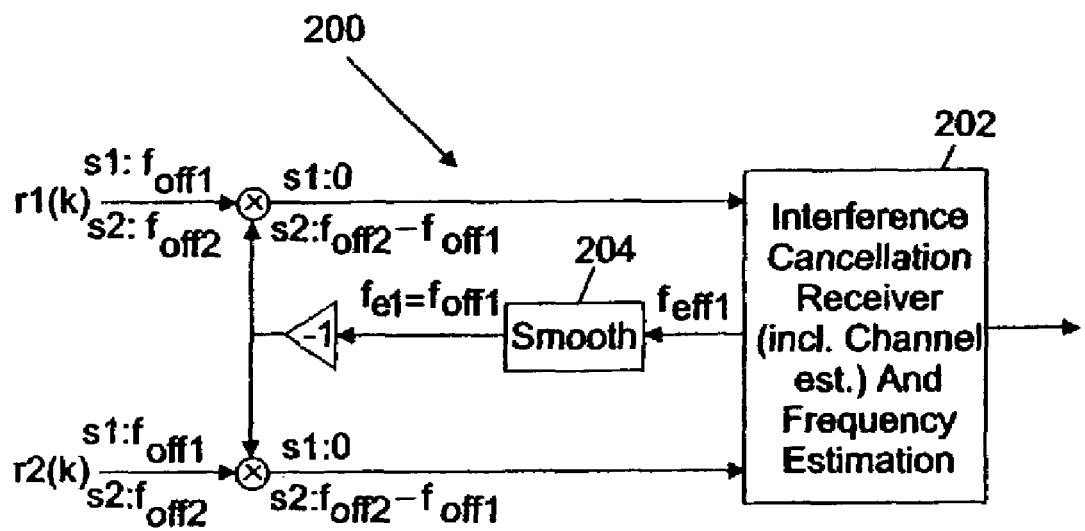
FIG. 2 is a functional block diagram that illustrates further detail of an interference cancellation receiver apparatus and the receive method using automatic frequency control according to an embodiment of the present invention.

One common approach for detecting signals transmitted by a MIMO system is to separately detect a signal transmitted from one antenna while canceling signals transmitted from the other antennas. This type of receiver is denoted as an interference cancellation receiver. In this case, AFC can be applied to compensate for the frequency error on the detected signal only. Such is the case with AFC as applied to the system of FIG. 1, which is shown in FIG. 2 for the first signal. The process is similar for the second signal. If two or more receive antennas are used, it is desired to frequency lock the receive chains so that, substantially, $f_R=f_{R1}=f_{R2}$. According to this embodiment of the invention, this approach is used for performing AFC for each detected signal. The first signal, r1(k) is denoted s1 when being processed within the receiver and the second signal r2(k) is denoted s2. In FIG. 2, receiver components 200 include an interference canceling, channel estimation, and frequency estimation block 202, and smoothing block 204. $f_{err1}$ is the initial frequency estimate for s1. $f_{e1}$ is an estimate of the frequency offset of s1. For convenience, the notations $f_{off1}$ and $f_{off2}$ are used, where $f_{off1}=f_1+f_{T1}+f_R$ and $f_{off2}=f_2+f_{T2}+f_R$. Further details on an AFC approach like that shown in FIG. 2 can be found in U.S. Pat. No. 5,818,093, which is incorporated herein by reference.

Figure 3:
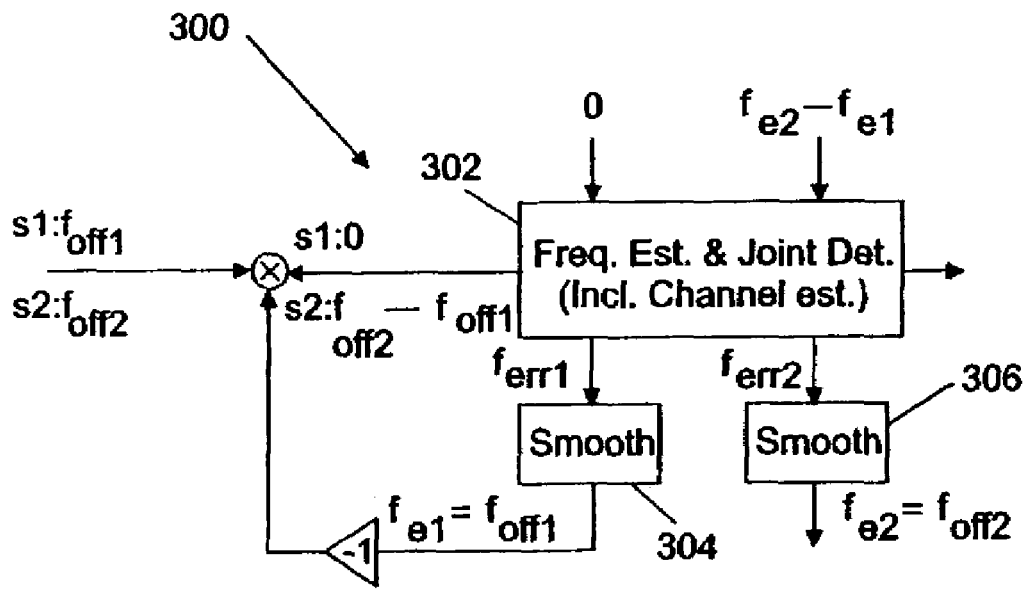
FIG. 3 is another functional block diagram that illustrates further detail of a joint demodulation receiver apparatus and the receive method using automatic frequency control according to another embodiment of the present invention.

The AFC approach just described is appropriate when the two user's signals are demodulated separately. The use of joint AFC, however, is critical to coherently detecting both signals jointly. The use of joint AFC is illustrated in FIG. 3, as applied in a system according to the invention. FIG. 3 shows receiver components 300, which includes a block, 302, for joint detection, frequency estimation and channel estimation, and two smoothing blocks, 304 and 306. Again, signals are denoted s1 and s2. The joint detection block 302 estimates frequency errors and outputs these estimates as $f_{err1}$ and $f_{err2}$. These frequency error estimates are fed into smoothing blocks 304 and 306 to estimate total frequency offsets, $f_{e1}$ and $f_{e2}$. With the present invention, the frequency offsets $f_1$ and $f_2$ are known. The frequency estimate $f_{e1}$ is applied to compensate the received signal, reducing signal s1's apparent frequency error to zero, while changing the apparent frequency error of the other signal to $f_{e2}-f_{e1}=f_{off2}-f_{off1}$. Initial estimates of $f_{e1}$ and $f_{e2}$ can be set to the known frequency offset values $f_1$ and $f_2$, respectively. The joint detection block 302 requires the estimation of the apparent frequencies to be input, as shown in FIG. 3. Further details on a joint AFC method similar to that shown in FIG. 3 can be found in U.S. patent application Ser. No. 09/699,920, filed Oct. 30, 2000 by the inventor hereof, which is incorporated herein by reference.

Finally, it should be noted that the carrier frequencies of the two transmitted signals could be locked in frequency. This can be accomplished by generating the carriers from the same source at the base station employing the two antennas. If the carriers are locked in frequency, then this has a couple of implications on the design of the transmitter and receiver. First, the value of $/f_1-f_2/$ can be made smaller, since both transmitters will be shifted by $f_{T1}$ ($=f_{T2}$), thus preserving the frequency difference of the known frequency offsets. Second, if the receiver chains are also locked in frequency, or if there is only one receive antenna, then $f_{e2}-f_{e1}=f_2-f_1$, which is known. In this case, while the AFC must still be applied to compensate for the unknown frequency errors, the difference in the apparent frequency components is known and need not be input to the joint detection block 302. To illustrate the efficacy of the approach, consider the received signal $y_1(k)$ which is comprised of the two transmitted signals $s_1(k)$ and $s_2(k)$, and corrupted by the channels $c_{11}(k)$ and $c_{21}(k)$, respectively. The received signal in this case is written as $$y_1(k)=e^{j2\pi(f_{T1}+f_{R1})k}c_{11}(k)s_1(k)+e^{j2\pi(f_{T2}+f_{R1})k}c_{21}(k)s_2(k)+n(k).$$

Figure 4:
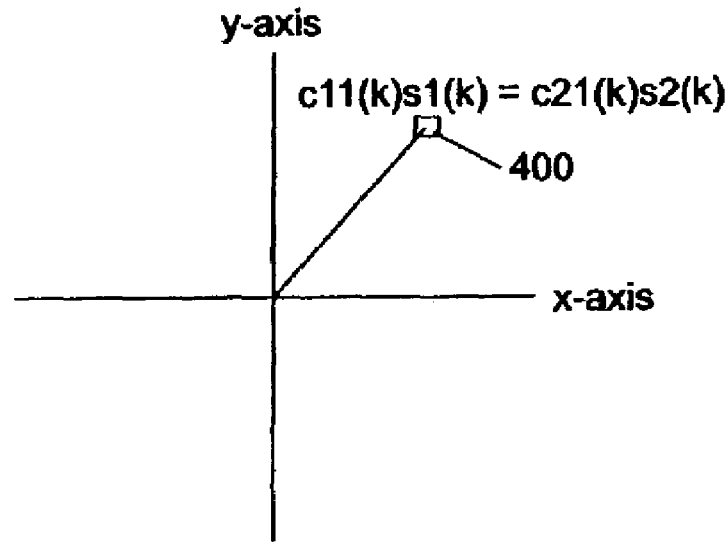
FIG. 4 is a phaser representation of the first and second signals without use of frequency offsets according to the invention.

The goal is to have $f_{T1}$ and $f_{T2}$ small, or to lock these two frequencies so that they affect the two transmitted signals in the same manner. However, the consequence of this goal is when $c_{11}(k)=c_{21}(k)$, then the situation in FIG. 4 occurs at a specific time instant. Namely, since the two channels are the same and the frequency errors are similar, then there is ambiguity in the detection procedure. FIG. 4 shows this as the phaser representing the channels for the two signals being coincident at point 400. When the channel coefficients $c_{11}(k)$ and $c_{21}(k)$ do not change or vary slowly over time, then the period where the ambiguity exists can last for long bursts of data. After adding frequency offsets $f_1$ and $f_2$ to the transmitted signals, the received signal becomes:

$$y_1(k)=e^{j2\pi(f_1+f_{T1}+f_{R1})k}c_{11}(k)s_1(k)+e^{j2\pi(f_2+f_{T2}+f_{R1})k}c_{21}(k)s_2(k)+n(k).$$

Figure 5:
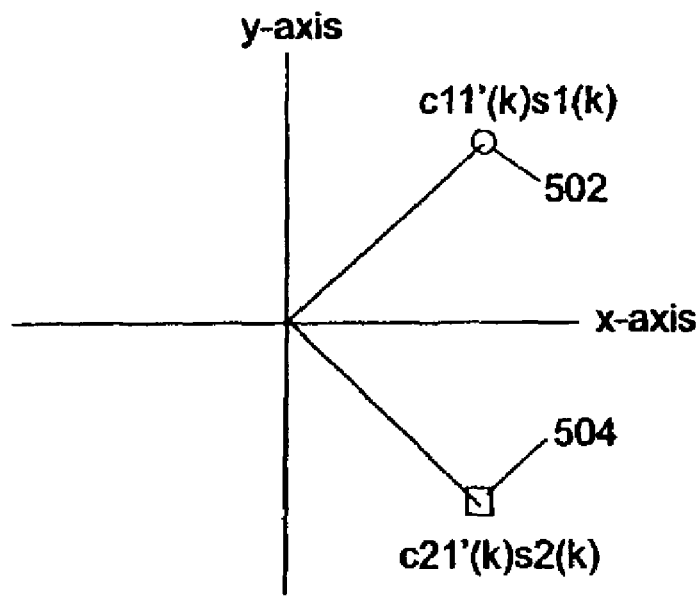
FIG. 5 is a phaser representation of the first and second signals according to embodiments of the invention to enable separation of the two signals.

Now, $f_{T1}$ and $f_{T2}$ can be made small or locked together since $f_1$ and $f_2$ have been added to distinguish the two transmitted signals. This gives the situation shown in FIG. 5 for one time instant. Here, the phaser shows that the channel responses are now not coincident at points 502 and 504. Even if they are coincident at some time instant, since $f_1$ does not equal $f_2$, they will not remain coincident for long data bursts.

Figure 6:
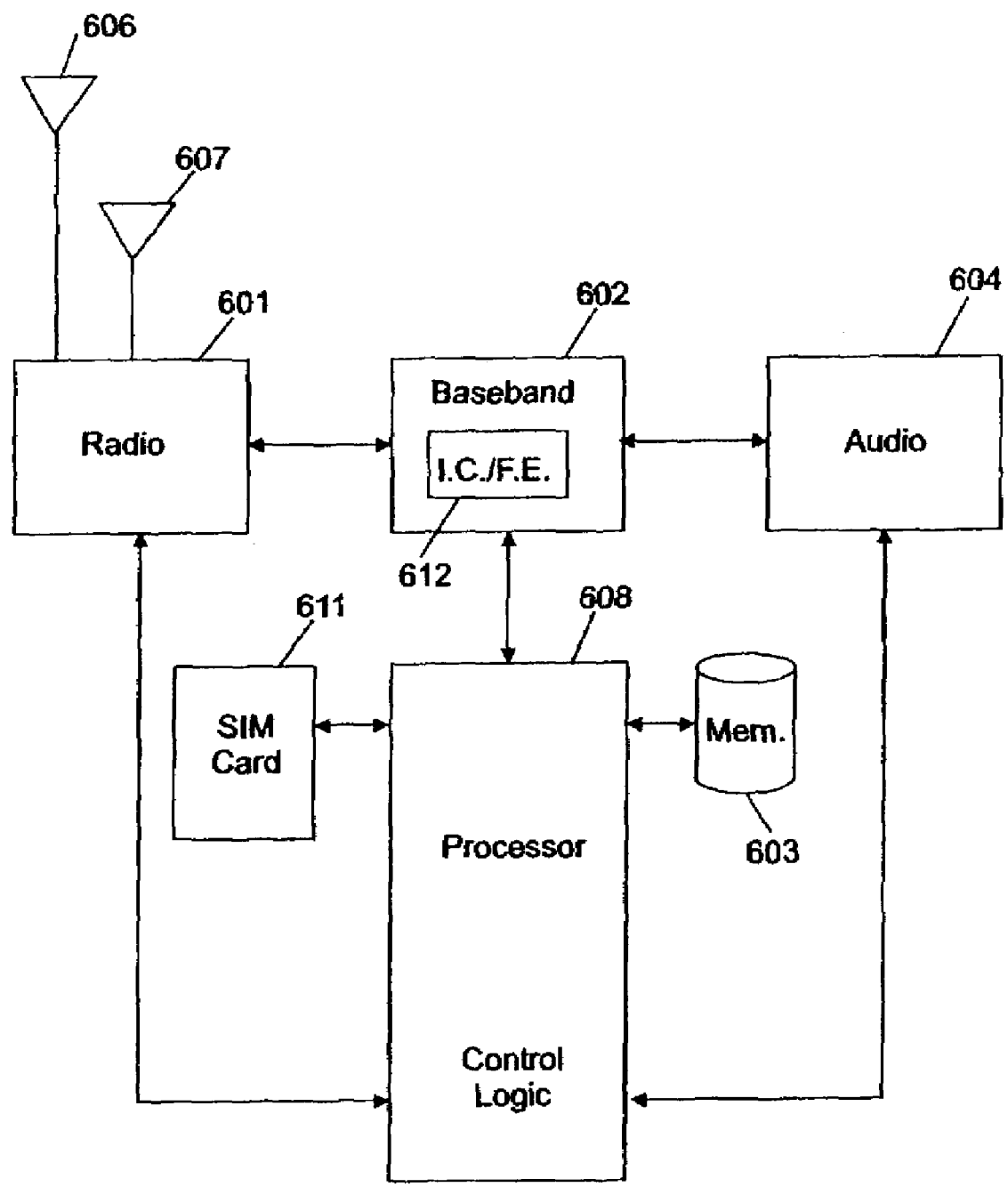
FIG. 6 is a functional block diagram of a mobile terminal incorporating a receiver according to embodiments of the invention.

FIG. 6 is a block diagram of a mobile terminal that implements the invention. FIG. 6 illustrates a terminal with voice capability, such as a mobile telephone. In such a case, the first and second signals may be contain voice or data or a combination thereof. The two signals may correspond to one information stream (e.g. one voice call) or multiple information streams (e.g. two voice users in a three-way call). This illustration is an example only, and the invention works equally well with mobile terminals that are dedicated to communicating with text or other forms of data. As shown in FIG. 6, the terminal includes radio block 601, a baseband logic block, 602, and an audio interface block, 604. Within radio block 601, the receive and transmit information is converted from and to the radio frequencies (RF) of the various carrier types, and filtering is applied, as is understood in the art. The terminal's antenna system, consisting of at least antenna 606, is connected to the radio block. As previously mentioned, a terminal may use two antennas, and the optional second antenna, 601, is also connected to the radio block. In baseband logic block 602, basic signal processing occurs, e.g., synchronization, channel coding, decoding and burst formatting. In this example, the baseband logic includes receiver subsystem 612, which performs interference canceling (I.C.), frequency estimation (F.E.), and other functions, according to the invention. The baseband logic block can be implemented by one or more ASIC's, or perhaps by a digital signal processor (DSP). Audio interface block 604 handles voice as well as analog-to-digital (A/D) and D/A processing. Processor and control logic block 608, coordinates the aforedescribed blocks and also plays an important role in controlling the human interface components (not shown) such as a keypad and liquid crystal display (LCD).

Program code, often in the form of microcode is stored in memory 603 and controls the operation of the terminal through the processor and control logic. Memory 603 in this embodiment also stores any known sets of frequency offsets so that they can be accessed and used according to the invention. The mobile terminal illustrated in FIG. 6 interfaces to a smart card identity module (SIM), 611, through a smart card reader interface. The interconnection between the processor and control logic, memory, and SIM is depicted schematically. The interface is often an internal bus. Also, any or all of these components may be discrete, implemented by multiple components, or integrated together in a single or small number of semiconductor devices.

A mobile terminal implementation of the invention does not have to be a traditional "cellular telephone type" of terminal, but may include a cellular radiotelephone with or without a multi-line display; a personal communications system (PCS) terminal that may combine a cellular radiotelephone with data processing, facsimile and data communications capabilities; a personal data assistant (PDA) that can include a radiotelephone, pager, Internet/intranet access, Web browser, organizer; and a conventional laptop and/or palmtop computer or other appliance that includes a radiotelephone transceiver. Mobile terminals are sometimes also referred to as "pervasive computing devices".

Figure 7:
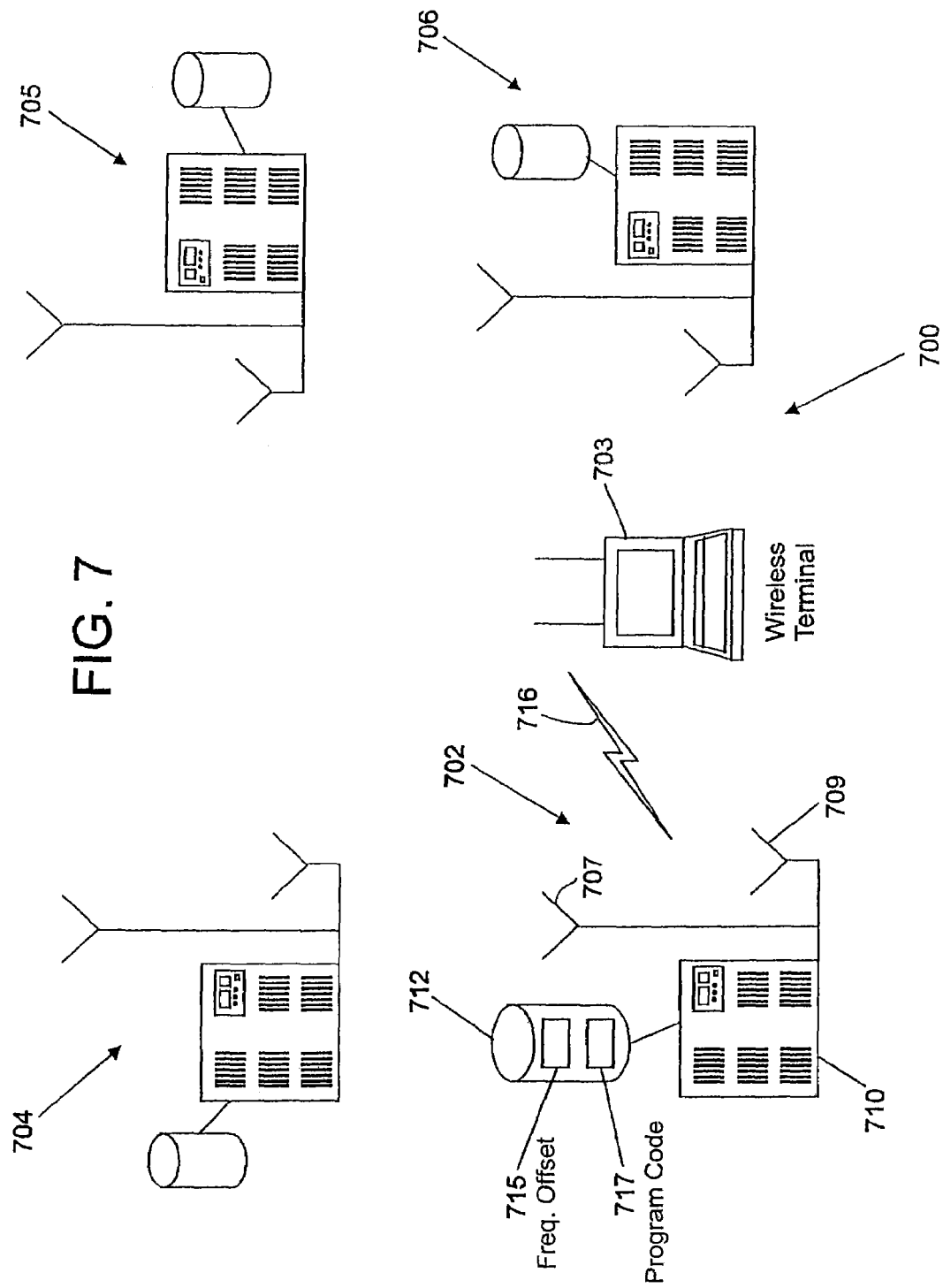
FIG. 7 is a network diagram of a system in which different frequency offsets are assigned to a plurality of neighboring base stations according to some embodiments of the invention.

FIG. 7 shows a base station system, 700, according to an embodiment of the invention. Base station system 700 includes at least one base station, 702, which is setting up a communication with mobile terminal 703. In many embodiments, base stations 704, 705, and 706 are included in the base station system and are all similar or identical to base station 702, and so some detail is omitted for these base stations in FIG. 7. Base stations 704, 705, and 706 may take over communication with mobile terminal 703 as mobile terminal 703 moves through the system. Base station 702 includes two antennas, 707 and 709 to transmit two user signals according to the invention. Transceiver apparatus, 710, includes the normal radio frequency components, processor, communication links to a mobile switching center, etc., as is understood in the art. Finally, memory 712 stores the transmit frequency offset, 715, of base station 702, and possibly frequency offsets of the neighboring base stations. The transceiver apparatus is operatively connected to the antennas and memory 712. The antennas transmit the signals at substantially the same bandwidth and carrier frequency. The memory may also contain at least some computer program code, 717, that operates the base station.

In the embodiment of FIG. 7, it is assumed that a base station, in this example base station 702, establishes a set of frequency offsets to use with mobile terminals. The value of the frequency offsets may be established directly, or impliedly by exchanging or transmitting values for $f_1$ and $f_2$, as previously referred to. In a system with multiple neighboring base stations, the base stations may have frequency offsets provisioned locally, remotely, or they may negotiate the frequency offsets. In the illustrated embodiment, the set of frequency offsets or sets of frequency offsets are communicated to mobile terminals over a control channel, as shown at 716 as part of the process of establishing the frequency offset or offsets to be used. When a plurality of frequency offsets are transmitted over a control channel to initiate communications, each unique set of transmit frequency offsets corresponds to one of the plurality of base stations that make up the base station system. Thus, a mobile station can identify each base station by its unique set of offsets.

Computer program code elements of the invention may be embodied in hardware and/or in software (including firmware, resident software, micro-code, etc.). These elements may take the form of a computer program product, which can be embodied by a computer-usable or computer-readable storage medium having computer-usable or computer-readable program instructions, "code" or a "computer program" embodied in the medium for use by or in connection with hardware such as the base station transceiver apparatus. Such a medium is pictured in FIG. 7 as memory 712. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner.

Specific embodiments of an invention are described herein. One of ordinary skill in the telecommunication arts will quickly recognize that the invention has other applications in other environments. In fact, many embodiments and implementations are possible. The appended claims are not intended to limit the scope of the invention to the specific embodiments described above. In addition, the recitation "means for" is intended to evoke a means-plus-function reading of an element in a claim, whereas, any elements that do not specifically use that recitation are not intended to be read as means-plus-function elements, even if they otherwise include the word "means".

What is claimed is:

1. A method of demodulating first and second signals, the method comprising:

receiving the first and second signals from first and second associated transmit antennas at a single antenna and at substantially the same bandwidth and substantially the same carrier frequency so that the first and second signals interfere with each other;

accessing a known set of frequency offsets between the first and second signals and the carrier frequency wherein the known set of frequency offsets is one of a plurality of sets of frequency offsets, each associated with a plurality of corresponding base stations so that a base station that corresponds to the first and second signals can be identified from among the plurality of corresponding base stations; and detecting different symbols in the first and second signals using frequency estimates for different first and second symbols based at least on part on the known set of frequency offsets.

2. The method of claim 1 wherein the first and second signals are locked in carrier frequency.

3. The method of claim 1 further comprising applying automatic frequency control (AFC) to the first and second signals.

4. The method of claim 3 wherein the applying of the AFC further comprises:
applying AFC to one of the first and second signals while canceling the other of the first and second signals; and
applying AFC to the other of the first and second signals while canceling the one of the first and second signals.

5. The method of claim 1 further comprising applying maximum-likelihood frequency estimation to the first and second signals.

6. The method of claim 1 further comprising applying a phase-locked loop (PLL) to the first and second signals.

7. Apparatus for demodulating first and second signals, the apparatus comprising:
means for receiving the first and second signals from first and second associated transmit antennas at a single antenna and at substantially the same bandwidth and substantially the same carrier frequency so that the first and second signals interfere with each other;
means for storing a known set of frequency offsets between the first and second signals and the carrier frequency wherein the known set of frequency offsets is one of a plurality of sets of frequency offsets, each associated with a plurality of corresponding base stations so that a base station that corresponds to the first and second signals can be identified from among the plurality of corresponding base stations; and
means for detecting different symbols in the first and second signals using frequency estimates for different first and second symbols based at least on part on the known set of frequency offsets.

8. The apparatus of claim 7 further comprising means for applying automatic frequency control (AFC) to the first and second signals.

9. The apparatus of claim 7 further comprising means for applying maximum-likelihood frequency estimation to the first and second signals.

10. The apparatus of claim 7 comprising means for applying a phase-locked loop (PLL) to the first and second signals.

11. A mobile terminal comprising:
a single antenna;
a radio block connected to the single antenna, the radio block operable to transmit signals, and also to receive first and second signals from first and second associated associate transmit antennas at substantially the same bandwidth and substantially the same carrier frequency so that the first and second signals interfere with each other;
a memory for storing a known set of frequency offsets between the first and second signals and the carrier frequency wherein the known set of frequency offsets is one of a plurality of sets of frequency offsets, each associated with a plurality of corresponding base stations;
processing and control logic connected to the memory for controlling the operation of the mobile terminal to identify a base station that corresponds to the first and second signals from among the plurality of corresponding base stations; and
baseband logic operatively connected to the radio block, the processing and control logic and the memory, the baseband logic operable to detect different symbols in the first and second signals using frequency estimates for different first and second signals based at least on part on the known set of frequency offsets.

12. The mobile terminal of claim 11 wherein the baseband logic is further operable to apply automatic frequency control (AFC) to the first and second signals.

13. The mobile terminal of claim 11 wherein the baseband logic is further operable to apply maximum-likelihood frequency estimation to the first and second signals.

14. The mobile terminal of claim 11 wherein the baseband logic is further operable to apply a phase-locked loop (PLL) to the first and second signals.

15. A method of transmitting first and second signals for discrimination by a mobile terminal, the method comprising:
establishing a plurality of sets of frequency offsets, wherein each of the plurality of sets of frequency offsets corresponds to a plurality of base stations and the plurality of sets of frequency offsets includes a known set of frequency offsets to be applied between the first and second signals and substantially the same carrier frequency;
transmitting the plurality of sets of frequency offsets, including the known set of frequency offsets to the mobile terminal over a control channel;
applying the known set of frequency offsets to the first and second signals;
upconverting the first and second signals for transmission at the carrier frequency and at substantially the same bandwidth so that the first and second signals interfere with each other; and
transmitting the first and second signals with different symbols to enable discrimination by the mobile terminal based at least in part on the known set of frequency offsets.

16. The method of claim 15 wherein the first and second signals are locked together in carrier frequency.

17. Apparatus for transmitting first and second signals for discrimination by a mobile terminal, the apparatus comprising:
means for establishing a plurality of sets of frequency offsets, wherein each the plurality of sets of frequency offsets corresponds to a plurality of base stations and the plurality of sets of frequency offsets includes a known set of frequency offsets to be applied between the first and second signals and substantially the same carrier frequency;

means for transmitting the plurality of sets of frequency offsets, including the known set of frequency offsets to the mobile terminal over a control channel;

means for storing the known set of frequency offsets;

means for applying the known set of frequency offsets to the first and second signals; and means for transmitting the first and second signals with different symbols at the carrier frequency and at substantially the same bandwidth so that the first and second signals interfere with each other, and to enable discrimination by the mobile terminal based at least in part on the known set of frequency offsets.

18. A base station system for use in mobile communication system, the base station system comprising a plurality of base stations wherein at least one base station further comprises:

a memory for storing at least one set of transmit frequency offsets from substantially the same carrier frequency wherein each transmit frequency offset in the at least one set of transmit frequency offsets corresponds to one of the plurality of base stations and the at least one set of transmit frequency offsets is part of a plurality of sets of frequency offsets;

at least two antennas; and transceiver apparatus operatively connected to the memory and the at least two antennas, the transceiver apparatus operable to establish and apply a known set of frequency offsets from the at least one set of transmit frequency offsets to first and second signals, the known set of frequency offsets being sent to at least one mobile terminal over a control channel, and to transmit the first and second signals with different symbols via the at least two antennas at the carrier frequency and at substantially the same bandwidth so that the first and second signals interfere with each other, and for discrimination by the at least one mobile terminal based at least in part on the known set of frequency offsets.

19. The base station system of claim 18 wherein carrier frequencies for the first and second signals are locked together.

20. A computer program product comprising a computer-readable memory having a computer program thereon for transmitting first and second signals for discrimination by a mobile terminal, the computer program comprising:

instructions for establishing a plurality of sets of frequency offsets, wherein each of the plurality of sets of frequency offsets corresponds to a plurality of base stations and the plurality of sets of frequency offsets includes a known set of frequency offsets to be applied between the first and second signals and substantially the same carrier frequency;

instructions for transmitting the plurality of sets of frequency offsets, including the known set of frequency offsets to the mobile terminal over a control channel;

instructions for storing the known set of frequency offsets;

instructions for applying the known set of frequency offsets to the first and second signals; and instructions for transmitting the first and second signals with different symbols at the carrier frequency and at substantially the same bandwidth so that the first and second signals interfere with each other, and to enable discrimination by the mobile terminal based at least in part on the known set of frequency offsets.

21. A method of communicating first and second signals between a base station and a mobile terminal, the method comprising:

establishing a plurality of sets of frequency offsets, wherein each of the plurality of sets of frequency offsets correspond to a plurality of corresponding base stations and the plurality of sets of frequency offsets includes a known set of frequency offsets to be applied between the first and second signals and substantially the same carrier frequency so that the base station can be identified from among the plurality of corresponding base stations;

sending the plurality of sets of frequency offsets, including the known set of frequency offsets to the mobile terminal over a control channel;

applying the known set of frequency offsets to the first and second signals;

upconverting the first and second signals to the carrier frequency;

transmitting the first and second signals with different symbols at the carrier frequency and at substantially the same bandwidth so that the first and second signals interfere with each other, and to enable discrimination by the mobile terminal; and detecting symbols in the first and second signals at the mobile terminal using a single antenna and using frequency estimates for different first and second symbols based at least on part on the known set of frequency offsets.

22. The method of claim 21 wherein the first and second signals are locked in carrier frequency at the base station.

23. The method of claim 21 further comprising applying automatic frequency control (AFC) to the first and second signals at the mobile terminal.

24. The method of claim 21 further comprising applying maximum-likelihood frequency estimation to the first and second signals at the mobile terminal.

25. The method of claim 21 further comprising applying a phase-locked loop (PLL) to the first and second signals at the mobile terminal.

26. A system for communicating first and second signals between a base station and a mobile terminal, the system comprising:

means for establishing a plurality of sets of frequency offsets, wherein each of the plurality of sets of frequency offsets corresponds to a plurality of corresponding base stations and the plurality of sets of frequency offsets includes a known set of frequency offsets to be applied between the first and second signals and substantially the same carrier frequency so that the base station can be identified from among the plurality of corresponding base stations;

means for sending the plurality of sets of frequency offsets, including the known set of frequency offsets to the mobile terminal over a control channel;

means for applying the known set of frequency offsets to the first and second signals;

means for upconverting the first and second signals to the carrier frequency;

means for transmitting the first and second signals with different symbols at the carrier frequency and at substantially the same bandwidth so that the first and second signals interfere with each other, and to enable discrimination by the mobile terminal; and means for detecting symbols in the first and second signals at the mobile terminal using a single antenna and using frequency estimates for different first and second symbols based at least on part on the known set of frequency offsets.

27. The system of claim 26 wherein the means for detecting further comprises means for applying automatic frequency control (AFC) to the first and second signals at the mobile terminal.

28. The system of claim 26 wherein the means for detecting further comprises means for applying maximum-likelihood frequency estimation to the first and second signals at the mobile terminal.

29. The system of claim 26 wherein the means for detecting further comprises means for applying a phase-locked loop (PLL) to the first and second signals at the mobile terminal.

* * * * *

UNITED STATES PATENT AND TRADEMARK OFFICE
CERTIFICATE OF CORRECTION

PATENT NO. : 7,327,811 B2 Page 1 of 1
APPLICATION NO. : 10/249329
DATED : February 5, 2008
INVENTOR(S) : Molnar It is certified that error appears in the above-identified patent and that said Letters Patent is hereby corrected as shown below:

In Column 5, Line 14, delete "$|_1 - f_2|$" and insert -- $|f_1 - f_2|$ --, therefor.

Signed and Sealed this

Fourteenth Day of October, 2008

JON W. DUDAS
*Director of the United States Patent and Trademark Office*